United States Patent [19]

Nieddu

[11] 4,367,896
[45] Jan. 11, 1983

[54] ARMATURE FOR BICYCLE SADDLES
[75] Inventor: Mario Nieddu, Valdellatorre, Italy
[73] Assignee: Cinelli Cino & C. S.r.l., Milan, Italy
[21] Appl. No.: 212,165
[22] Filed: Dec. 2, 1980
[30] Foreign Application Priority Data Dec. 6, 1979 [IT] Italy .............. 53785/79[U]

[51] Int. Cl.$^3$ .............................................. B62J 1/00
[52] U.S. Cl. .................................. 297/195; 297/207
[58] Field of Search .............. 297/195, 204, 205, 206, 297/207

[56] References Cited

U.S. PATENT DOCUMENTS

| 293,656 | 2/1884 | Lamplugh | 297/207 |
|---|---|---|---|
| 499,244 | 6/1893 | Naly et al. | 297/207 X |
| 578,837 | 3/1897 | Seaman | 297/207 X |
| 597,055 | 1/1898 | Devore | 297/207 |
| 682,425 | 9/1901 | Ray et al. | 297/195 |
| 1,512,145 | 10/1924 | Starck | 297/202 |

FOREIGN PATENT DOCUMENTS

| 1218752 | 5/1960 | France | 297/207 |
|---|---|---|---|
| 1399155 | 4/1965 | France | 297/195 |
| 1937 | of 1895 | United Kingdom | 297/204 |

*Primary Examiner*—Roy D. Frazier
*Assistant Examiner*—Peter A. Aschenbrenner
*Attorney, Agent, or Firm*—Sughrue, Mion, Zinn, Macpeak & Seas

[57] ABSTRACT

An armature for supporting a shell of a bicycle saddle from a clamp carried by a saddle support pipe consists of a single die-forged piece of light alloy. The single piece has a general shape similar to that of a fork with a yoke portion, a pair of symmetrical prongs extending in one direction each from a respective opposite end of the yoke portion, and a stem portion extending from the middle of the yoke portion in a direction opposite to said one direction and in a general plane of symmetry of the sprongs. Each of said sprongs has a respective rectilinear fastening portion extending from the yoke and a respective tail portion extending from the fastening portion. The rectilinear fastening portions are parallel to each other, so as to define a general base plane which is perpendicular to said plane of symmetry, and are adapted to be clamped in said clamp. The tail portions diverge from each other and have free ends which are adapted to support a rear portion of the saddle shell. The stem portion has a free end which is adapted to support a front portion of the saddle shell.

11 Claims, 5 Drawing Figures

U.S. Patent
Jan. 11, 1983
4,367,896
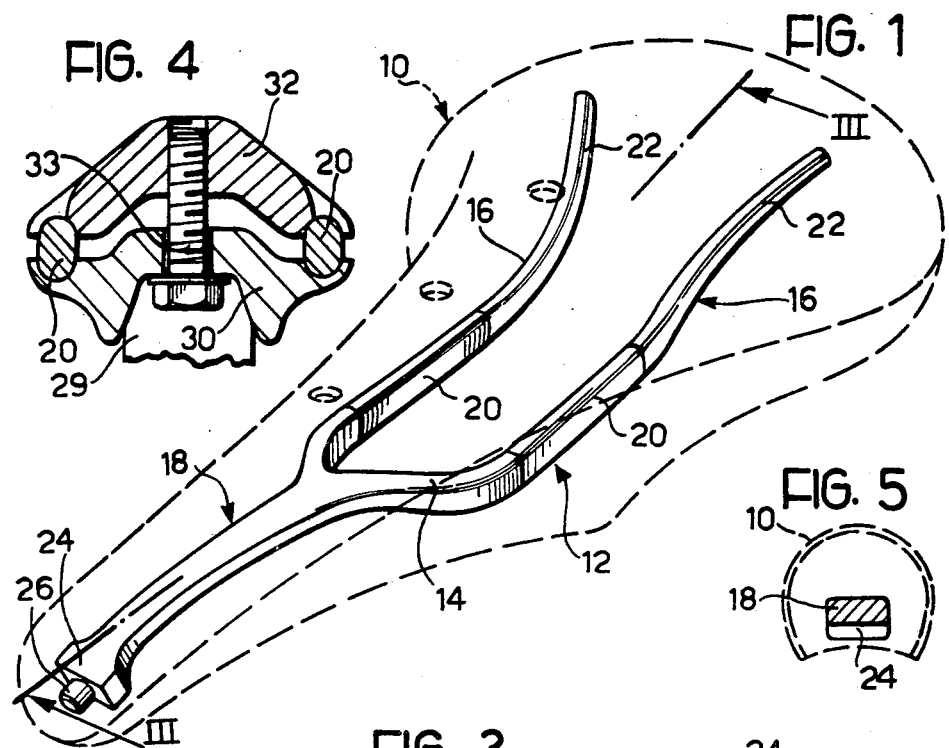
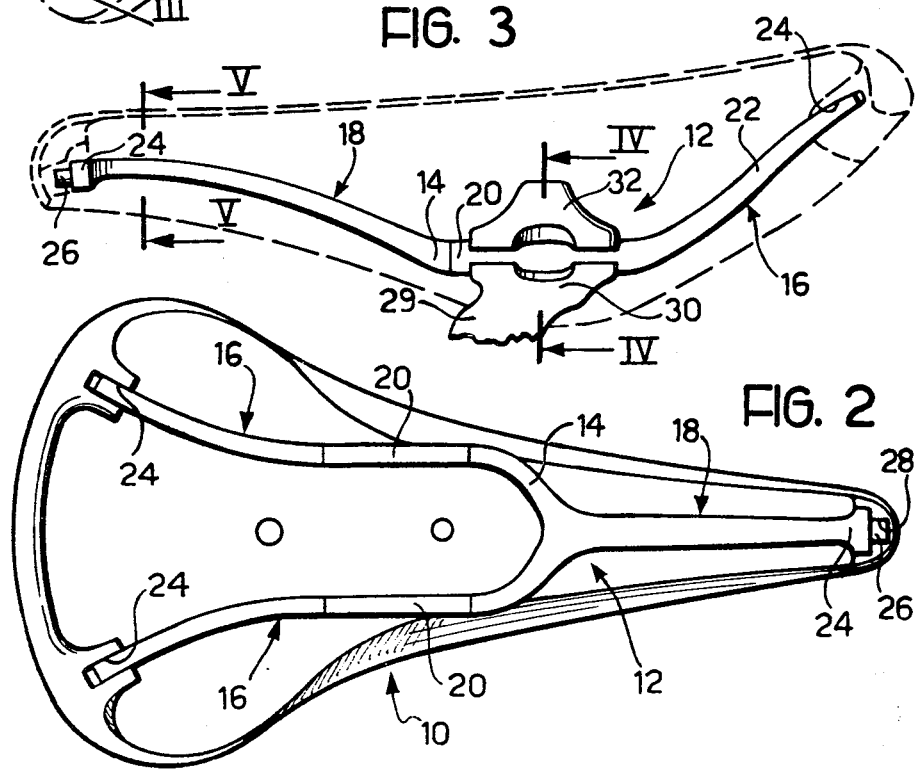

ARMATURE FOR BICYCLE SADDLES

This invention relates to bicycle saddles comprising a shell and a support armature for the shell.

More particularly the invention relates to an armature for supporting a shell of a bicycle saddle from a clamp carried by a saddle support pipe, the armature being of the type including a pair of side by side shaped branches having rear free ends which are adapted to support a rear portion of the saddle shell, said branches being symmetrically disposed with respect to a longitudinal plane of symmetry, being joined together at their other ends and having an appendage which extends from said other ends and is adapted to support a front portion of the shell, and wherein the branches have rectilinear fastening portions which are parallel to each other and are situated in an intermediate position along the armature, said fastening portions lying in a general base plane which is perpendicular to the plane of symmetry and being adapted to be clamped in the clamp for their fastening to the saddle support pipe.

Known armatures of this kind include a pair of branches constituted by shaped sections of light alloy round bar. At the front end of the saddle the branches extend side by side and are joined together by welding or by a clamp or similar connecting member. An appendage extends from the joint and supports the front portion of the saddle shell, for example being fitted into a corresponding seat of the latter. The two branches diverge from the joint to the rear end of the armature. In an intermediate region of their length the branches have the said rectilinear fastening sections. The branches have tail portions which extend upwardly to their rear free ends and which support the rear portion of the saddle, for example being fitted into corresponding seats of the latter.

The known armatures of the above kind are simple and economical to manufacture and have the advantage of being springy, due to the resiliency of the bars. However, their weight is relatively high, notwithstanding that they are made from light alloy bars.

Racing bicycles are becoming lighter and lighter and every further reduction of their weight, even of a few grams, is considered to be an advantage.

The main object of the present invention is to provide an armature which is lighter than the known armatures of the aforesaid kind, while affording the necessary springy features to the saddle. According to the present invention this object is achieved by means of an armature of the aforesaid kind, characterised in that it consists of a single die-forged piece of light alloy, said single piece having a general shape similar to that of a fork with a yoke portion, a pair of symmetrical prongs extending in one direction each from a respective opposite end of the yoke portion and constituting said branches, and a stem portion extending from the middle of the yoke portion in a direction opposite to said one direction and in the said general plane of symmetry, each of said prongs having a respective said rectilinear fastening portion extending from the yoke portion and a respective tail portion extending from the fastening portion, said tail portions diverging from each other and their free ends being adapted to support the rear portion of the saddle shell, and said stem portion having a free end which is adapted to support the front portion of the saddle shell.

The objects and advantages of the invention will be readily apparent from the following description and drawings of the preferred embodiment.

In the drawings:

FIG. 1 is a perspective view of an armature supporting a saddle shell, the latter being shown in dotted lines, FIG. 2 is a plan view from below of the armature and the saddle shell of FIG. 1, FIG. 3 is a longitudinal section on the line III—III of FIG. 1, which also shows the upper portion of a support pipe with clamping jaws for fastening the armature to the pipe.

FIG. 4 is a cross section on the line IV—IV of FIG. 3, and

FIG. 5 is another cross section on the line V—V of FIG. 3.

Referring to FIGS. 1 to 3, a bicycle saddle includes a shaped shell 10 of relatively flexible plastics or leather. The shell 10 is supported by an armature according to the preferred embodiment of the invention, generally indicated by 12.

The armature 12 is constituted by a single light alloy piece, obtained by die-forging and quenching. This piece can be made, for example, of an aluminium-magnesium alloy such as those known under the trade names "Anticorodal" and "Ergal".

As shown in FIGS. 1 and 2, the armature 12 has a shape similar to that of a fork. The armature has a U-shaped yoke portion 14 from which a pair of symmetrical prongs or branches 16 extend towards the rear portion of the shell 10. A stem portion 18 extends from the middle of the yoke portion 14 towards the front portion of the shell.

In a region corresponding to the middle of the length of the armature 12, each prong 16 has a rectilinear fastening portion 20. The portions 20 are parallel to each other and each of them is followed by a tail portion or horn 22 having a flattened S shape, as shown.

The two tail portions 22 symmetrically diverge from each other and extend with a slope with respect to a general plane defined by the two rectilinear fastening portions 20. When the armature 10 is mounted on a bicycle, the said general plane is substantially horizontal and the two tail portions 22 extend upwardly and rearwardly.

The free ends of the tail portions 22 support the rear portion of the shell 10, said free ends being fitted for example into two corresponding blind holes or seats 24 of the shell 10, as shown.

The stem portion 18 lies in the general longitudinal plane of symmetry of the prongs, which plane is perpendicular to a general base plane defined by the parallel fastening portions 20. The stem portion 18 extends from the middle of the yoke portion 14 and with a slope with respect to the latter general plane, i.e. forwardly and upwardly in the mounted condition of the armature 10. The stem portion 18 has an arcuate shape with its concavity facing downwardly in the mounted condition, i.e. on the side of the said general base plane.

The stem portion 18 has, at its free end, an enlarged abutment portion 24 which is followed by an appendage consisting in a cylindrical peg 26. The peg 26 supports the front portion of the shell 10, for example being fitted in a corresponding blind hole or seat 28 of the shell.

The armature 10 can be fastened to a saddle support pipe 29 of the bicycle by means of the rectilinear portions 12, by clamping the latter between a lower jaw 30 and an upper jaw 32 of a clamp of a well known type.

The lower jaw 30 is integral with the upper end of the support pipe 29. The jaws 30 and 32 are connected together by a clamping screw 33, as shown in FIG. 4.

The prongs 16 are of flattened and ovalized cross-section, whose major axis is vertical when the armature 12 is mounted on the bicycle. This cross-section is greatest and constant along the rectilinear portions 20. For example, the major axis thereof has a value of 12 mm and the minor axis thereof has a value of 7 mm. The tail portions 22 are of cross sections similar to that of the fastening portions 20, but they are tapered up to their free ends. The minor axes of the cross sections of the tail portions are everywhere substantially equal to that of the rectilinear sections 20, while their major axes gradually decrease to a value, for example, of 6 mm at the free ends.

It has been found that the above values are the optimum in the case of prongs 16 whose length, projected on a plane, is of the order of 120 mm, the rectilinear portions 20 having a length of about 60 mm and the tail portions 22 having a length of about 60 mm.

The above shape of the prongs 16 as described is favourable since it allows to save weight and to take the maximum advantage from the strength characteristics of their material. When the rectilinear portions 20 are clamped between the jaws 30, 32 the behaviour of the two end portions 22 is that of a beam restrained at one end and with a load concentrated on the other end. The reason of the tapering of the tail portions is the fact that the moment of flexure increases from the free end of each portion 22 to its restrain point, which corresponds to the region where the portion 22 meshes with the rectilinear portion 20.

Also the stem portion 18 has flattened cross sections, as shown in FIG. 5. The major axes of these cross sections are however horizontal instead of vertical when the armature 12 is mounted on the bicycle. Cross sections of this kind afford good flexibility to the stem 18 just where flexibility is desirable. Also the behaviour of the stem 18 is that of a beam restrained at one end, with a load concentrated on the other or free end. This load is not so high as that which bears on the free ends of the tail portions 22, since the weight of the rider bears for the most part on the rear portion of the saddle. In this condition it is preferable to have a stem portion with relatively low moments of inertia with respect to the horizontal axes of its cross sections, with an admissible loss of flexural strength but with the benefit of a greater flexibility.

Also the stem portion 18 is tapered towards its free end. Its width, which corresponds to the major axes of its cross sections, does not vary or decreases very slightly from the yoke portion 14 to the enlarged end portion 24. On the contrary, the thickness of the stem 18 gradually decreases towards the enlarged end portion 24. The purpose of the latter shape is again that of saving weight, while taking the maximum advantage from the strength of the material. Good flexible resiliency of the stem portion 18 has been obtained in practice with a length of the order of 110 to 120 mm from its root to its free end and giving a value of the order of 15 mm to the major axes of its cross sections and a value decreasing from about 9 mm to about 7.5 mm to the minor axes.

I claim:

1. An armature for supporting a shell of a bicycle saddle from a clamp carried by a saddle support pipe, said armature consisting of a single die-forged piece of light alloy, said single piece having a general shape similar to that of a fork with a yoke portion, a pair of symmetrical prongs extending in one direction each from a respective opposite end of the yoke portion, and a stem portion extending from the middle of the yoke portion in a direction opposite to said one direction and in a general plane of symmetry of the prongs, each of said prongs having a respective rectilinear fastening portion extending from the yoke and a respective tail portion extending from the clamping portion, said rectilinear fastening portions being parallel to each other, so as to define a general base plane which is perpendicular to said plane of symmetry, and being adapted to be clamped in said clamp, said tail portions diverging from each other and having free ends which are adapted to support a rear portion of the saddle shell, and said stem portion having a free end which is adapted to support a front portion of the saddle shell.

2. An armature as claimed in claim 1, wherein the prongs are of flattened cross section whose major axis is perpendicular to said base plane.

3. An armature as claimed in claim 2, wherein the tail portions of the prongs are each tapered with gradually decreasing cross sections from the fastening portion to the free ends of said tail portions.

4. An armature as claimed in claim 3, wherein the taper of the tail portions is essentially given by a gradual decrease of the major axes of their cross sections.

5. An armature as claimed in claim 1, wherein the stem portion is of flattened cross section whose major axis is parallel to said base plane.

6. An armature as claimed in claim 5, wherein the stem portion is tapered with gradually decreasing cross sections from the yoke portion to the free end of the stem portion.

7. An armature as claimed in claim 6, wherein the taper of the stem portion is essentially given by a gradual decrease of the major axes of its cross sections.

8. An armature as claimed in claim 1, wherein the yoke portion is U-shaped and its said opposite ends correspond to the ends of the U shape and mesh with a respective said fastening portion.

9. An armature as claimed in claim 1, wherein the tail portions and the stem portion extend each with a slope from said base plane to their respective free end and on the same side of said base plane.

10. An armature as claimed in claim 9, wherein the stem portion is arcuate with its concavity on the side facing to said base plane.

11. An armature as claimed in claim 1, wherein said stem portion has, at its free end, an enlarged abutment portion which is followed by an appendage in the form of a cylindrical peg.

* * * * *